United States Patent
Jayavelu et al.

(10) Patent No.: US 12,019,697 B2
(45) Date of Patent: Jun. 25, 2024

(54) SYSTEMS AND METHODS FOR IDENTIFYING INCIDENTS USING SOCIAL MEDIA

(71) Applicant: Walmart Apollo, LLC, Bentonville, AR (US)

(72) Inventors: Arumugam Jayavelu, Bentonville, AR (US); Lucas McDonald, Rogers, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/277,933

(22) Filed: Feb. 15, 2019

(65) Prior Publication Data
US 2019/0361951 A1   Nov. 28, 2019

Related U.S. Application Data

(60) Provisional application No. 62/782,334, filed on Dec. 19, 2018, provisional application No. 62/710,496, filed on Feb. 16, 2018.

(51) Int. Cl.
| | | |
|---|---|---|
| *G06F 16/95* | (2019.01) | |
| *G06F 16/9536* | (2019.01) | |
| *G06F 16/9537* | (2019.01) | |
| *G06F 16/9538* | (2019.01) | |
| *G06F 18/214* | (2023.01) | |
| *G06N 20/00* | (2019.01) | |

(52) U.S. Cl.
CPC ...... *G06F 16/9536* (2019.01); *G06F 16/9537* (2019.01); *G06F 16/9538* (2019.01); *G06F 18/2148* (2023.01); *G06N 20/00* (2019.01)

(58) Field of Classification Search
CPC ...... G06Q 50/01; G06Q 50/265; G06N 20/00; G06F 16/951
See application file for complete search history.

(56) References Cited

U.S. PATENT DOCUMENTS

| | | |
|---|---|---|
| 8,234,310 B2 | 7/2012 | Pottenger |
| 8,291,076 B2 | 10/2012 | Luna |

(Continued)

FOREIGN PATENT DOCUMENTS

| | | |
|---|---|---|
| WO | 2011025460 A1 | 3/2011 |
| WO | 2013086931 A1 | 6/2013 |

OTHER PUBLICATIONS

Businessline, Twitter may aid disaster response in real time. Retrieved online at: http://www.thehindubusinessline.com. 2 pages, Jan. 9, 2018.

(Continued)

*Primary Examiner* — Mohammad S Rostami
(74) *Attorney, Agent, or Firm* — Fitch, Even, Tabin & Flannery LLP (57) ABSTRACT

Systems, methods, and machine-readable media are provided for identifying violent or other specified types of incidents. An exemplary system captures social media data from at least one source relating to an incident occurring at one of a group of predetermined locations, The exemplary system processes the social media data to determine a severity and location of a violent incident and clusters multiple reports of a single incident. The exemplary system further displays a location of the incident on a map and displays details of the incident.

21 Claims, 10 Drawing Sheets

(56) References Cited

U.S. PATENT DOCUMENTS

| | | |
|---|---|---|
| 8,463,789 B1 | 6/2013 | Joshi |
| 8,478,289 B1 | 7/2013 | Lookingbill |
| 8,732,240 B1 | 5/2014 | Tomkins |
| 8,738,613 B2 | 5/2014 | Ahmed |
| 8,775,406 B2 | 7/2014 | Gross |
| 8,943,053 B2 | 1/2015 | Kristiansson |
| 9,177,065 B1 | 11/2015 | Ben-Yair |
| 9,397,904 B2 | 7/2016 | Berlingerio |
| 10,540,660 B1 | 1/2020 | Smith |
| 10,552,625 B2 | 2/2020 | Grant |
| 10,831,847 B2 | 11/2020 | Bindal |
| 2008/0046298 A1 | 2/2008 | Ben-Yehuda |
| 2009/0248643 A1 | 10/2009 | Wasson |
| 2010/0076806 A1 | 3/2010 | Grichnik |
| 2011/0161116 A1 | 6/2011 | Peak |
| 2011/0261067 A1 | 10/2011 | Trinko |
| 2011/0314007 A1 | 12/2011 | Dassa |
| 2012/0102113 A1 | 4/2012 | Chartier |
| 2012/0123806 A1 | 5/2012 | Schumann, Jr. |
| 2012/0256745 A1 | 10/2012 | Piett |
| 2012/0320214 A1 | 12/2012 | Kundu et al. |
| 2013/0018823 A1 | 1/2013 | Masood |
| 2013/0100268 A1 | 4/2013 | Mihailidis |
| 2013/0103667 A1 | 4/2013 | Minh |
| 2013/0124653 A1 | 5/2013 | Vick |
| 2013/0198204 A1 | 8/2013 | Williams |
| 2013/0212175 A1* | 8/2013 | Cheng .................... G06Q 50/01 709/204 |
| 2013/0232042 A1* | 9/2013 | Simpson ................. H04L 67/10 705/30 |
| 2013/0238356 A1 | 9/2013 | Torii |
| 2014/0087886 A1 | 3/2014 | Osvald |
| 2014/0316911 A1 | 10/2014 | Gross |
| 2015/0026088 A1 | 1/2015 | Alber |
| 2015/0161867 A1 | 6/2015 | Bell |
| 2015/0186378 A1* | 7/2015 | Berlingerio ............. H04L 51/30 707/748 |
| 2015/0195676 A1* | 7/2015 | Endress .................. H04W 4/90 455/404.2 |
| 2015/0310018 A1 | 10/2015 | Fan |
| 2015/0379429 A1* | 12/2015 | Lee .......................... G09B 5/00 706/11 |
| 2016/0189043 A1 | 6/2016 | McGeever et al. |
| 2016/0379326 A1* | 12/2016 | Chan-Gove ......... H04L 63/1433 705/325 |
| 2017/0061544 A1* | 3/2017 | McClain ................ G06Q 40/08 |
| 2017/0132710 A1 | 5/2017 | Duncan |
| 2017/0140051 A1 | 5/2017 | Ball |
| 2018/0315283 A1* | 11/2018 | Brosnan .............. G06F 16/2465 |
| 2019/0034820 A1* | 1/2019 | Manning ................ G06N 5/022 |
| 2019/0058721 A1* | 2/2019 | Cullison ............. H04L 63/1425 |
| 2019/0065532 A1* | 2/2019 | Conahan ............... G06Q 50/01 |
| 2019/0073734 A1* | 3/2019 | Reischer ............... G06Q 50/01 |
| 2019/0102459 A1* | 4/2019 | Patterson ............. G06F 40/295 |

OTHER PUBLICATIONS

Forgesson, 5 Tactics to Consider When Tackling Retail Crime & Violence. Security, Solutions for Enabling and Assuring Business. BNP Media, 3 pages, (2018).

Hitachi, Boost Business Success with Hitachi Smart Spaces and Video Intelligence. Improve the Customer Experience and Increase Store Return on Investment. Hitachi Vantara, www.HitachiVantara.com, 6 pages, Dec. 2017.

Pinkerton®, Global Incident Reporting. Retrieved online at: https://www.pinkerton.com/intelligenceservices/intelligencealerting/.

Pinkerton's Business Intelligence Alert Services. Retrieved, Feb. 3, 2018, 3 pages.

Qian, Real-time Incident Detection Using Social Media Data Final Report, Commonwealth of Pennsylvania, Department of Transportation. May 9, 2016, 54 pages.

* cited by examiner

SYSTEMS AND METHODS FOR IDENTIFYING INCIDENTS USING SOCIAL MEDIA

CROSS-REFERENCE TO RELATED PATENT APPLICATIONS

This application claims priority to U.S. Provisional Patent Application No. 62/782,334, filed on Dec. 19, 2018, and U.S. Provisional Patent Application No. 62/710,496, filed on Feb. 16, 2018, the content of which is hereby incorporated by reference in its entirety

BACKGROUND

Although the retail industry is not traditionally considered a high hazard industry, there is a risk of violent and other incidents occurring in retail establishments. There are a variety of risk factors that come into play. Retail stores tend to have a greater exposure to the public than other industries. Money is frequently exchanged in plain view and kept in cash registers on-site. Also, retail employees often work alone or in small numbers, and their shifts can range from the early morning hours to late into the night when there are fewer people around. Additionally, retail stores may control valuable property or possessions, and these items may seem especially desirable and accessible.

Online social media is becoming the place to report observations of everyday occurrences including social disorder, criminal activity, and acts of violence. People are increasingly using social media sites such as Twitter®, Facebook®, Instagram® and Snapchat® as their first place for reporting these types of incidents.

SUMMARY

Systems, methods, and machine-readable media are provided for identifying violent or other specified types of incidents using social media data. An exemplary system captures social media data from at least one source relating to an incident occurring at one of a group of predetermined locations. The exemplary system processes the social media data to determine a severity and location of a violent incident and clusters multiple reports of a single incident to consolidate reporting. The exemplary system may display a location of the incident on a map and display details of the incident.

BRIEF DESCRIPTION OF THE DRAWINGS

The accompanying drawings, which are incorporated in and constitute a part of this specification, illustrate one or more embodiments of the invention and, together with the description, help to explain the invention. The drawings are not necessarily to scale, or inclusive of all elements of a system, emphasis instead generally being placed upon illustrating the concepts, structures, and techniques sought to be protected herein. In the drawings.

DETAILED DESCRIPTION

A portion of the disclosure of this patent document contains or may contain material that is subject to copyright protection. The copyright owner has no objection to the photocopy reproduction by anyone of the patent document or the patent disclosure in exactly the form it appears in the U.S. Patent and Trademark Office patent file or records, but otherwise reserves all copyright rights whatsoever.

Social media, including but not limited to Twitter®, has become a useful tool for providing all types of information. Recent data shows that for Twitter®, users provide 340 million tweets every day from more than 140 million active users. Other social media platforms (e.g. Facebook®, Snapchat®, Instagram®, and the like) are also valuable resources for providing the latest information regarding events taking place.

While a social media service can provide a vast amount of information, mining information from social media data can be difficult. As an example, tweets are 280 characters or less, and typically include cryptic abbreviations and/or grammatical errors.

In the following description, Twitter® is used as the social media source for illustrative purposes, though it should be understood that other social media sources may also be used within the scope of the present invention. Further, in the description, an illustrative "StoreX" is used as an exemplary retail entity controlling multiple stores in multiple locations, but it should be understood that the invention is equally applicable to other entities controlling multiple facilities such as retail locations.

In one embodiment, a monitoring system includes a server executing a monitoring module to monitor social media for data involving any retail stores among a chain of retail stores operated by an entity. As a non-limiting example, the data from social media may include data relating to lost or stolen items (e.g., a cellular telephone); data relating to more serious incidents such as a physical altercation between two or more customers, or a bomb scare, or data relating to potentially serious violent incidents where a weapon is used, an assault or robbery has occurred, or a kidnapping has taken place. The monitoring module may also identify and filter out false or hoax data. The monitoring system verifies the accuracy of the social media data and determines any locations referred to in the data. The monitoring system additionally may provide notifications relating to the incident.

In one embodiment, to identify relevant social media data indicative of an incident of interest to an entity, the monitoring system is configured to perform a series of filtering operations. A first filtering operation may be performed to determine whether the social media data are related to a store controlled by an entity (e.g. StoreX). The message may be filtered using the store name, different nicknames, or variations associated with the store name.

A second step of filtering social media data associated with a particular brand of store may be used to determine if the social media data relates to a particular type of incident. For example, data relating to a sale price or level of customer service may not be considered to be serious and may be filtered out from further consideration. On the other hand, data that relates to the possible safety and security of the store, customers, and/or employees such as, but not limited to, types of violent crime that are occurring or have occurred, and pending threats of violence or serious property damage, may be considered to be a serious message that requires further consideration.

A third step of filtering of the social media data may be performed after determining an incident type in order to assess the seriousness of the incident in order to assign a priority. This step may involve categorizing the level of the incident and determining whether store management, local authorities, and/or federal authorities should be notified if the situation turns out to satisfy a severity criterion.

A fourth level of filtering of the social media data may be performed to determine whether the incidents from the social media that have undergone the first three levels of filtering can be verified. For example, a single report of an incident could be a hoax, while multiple reports from different sources lend more credibility to the data. Accordingly, a clustering operation may be performed so that similar social media data that relate to a single incident may be clustered together.

Additionally, the social media data may be further processed by the monitoring module in an attempt to track the incident to a precise location, for example a particular location of a retail store or a single store among a group of stores controlled by the entity. Once an incident has been verified, additional pre-defined actions may be automatically taken including alerting customers, employees, and proper authorities.

In an embodiment, the monitoring system may utilize machine learning to analyze past events to further refine the capturing and filtering of the social media data on an ongoing basis and provide a more accurate response to the social media data. As one non-limiting example, machine learning may be used to analyze how the number of people commenting on an event on social media equates to the actual occurrence of the event so as to assist in the determination of how likely the event is to be real. In one embodiment, the performance of the machine learning may utilize a convolutional neural network.

In one embodiment, following the determination that an event is real and the identification of the event location by the monitoring system, the monitoring system may generate a graphical user interface such as a real-time dashboard to display the information determined by the monitoring system to authorized individuals associated with the entity. The real-time dashboard may include an indication of all of the currently occurring events overlaid on a geographic depiction of some or all of the facilities controlled by an entity (e.g. an entity controlling a chain of retail stores and distribution centers). The real-time dashboard may also enable a user to change the view to focus on a single store and may also be configured to display historical data and trends.

While an example has been described using a retail store environment (e.g., StoreX), the presently described process also can be used for other environments or situations, including but not limited to incidents involving spousal or child abuse, incidents involving driving under the influence of drugs or alcohol, and the like.

Figure 1:
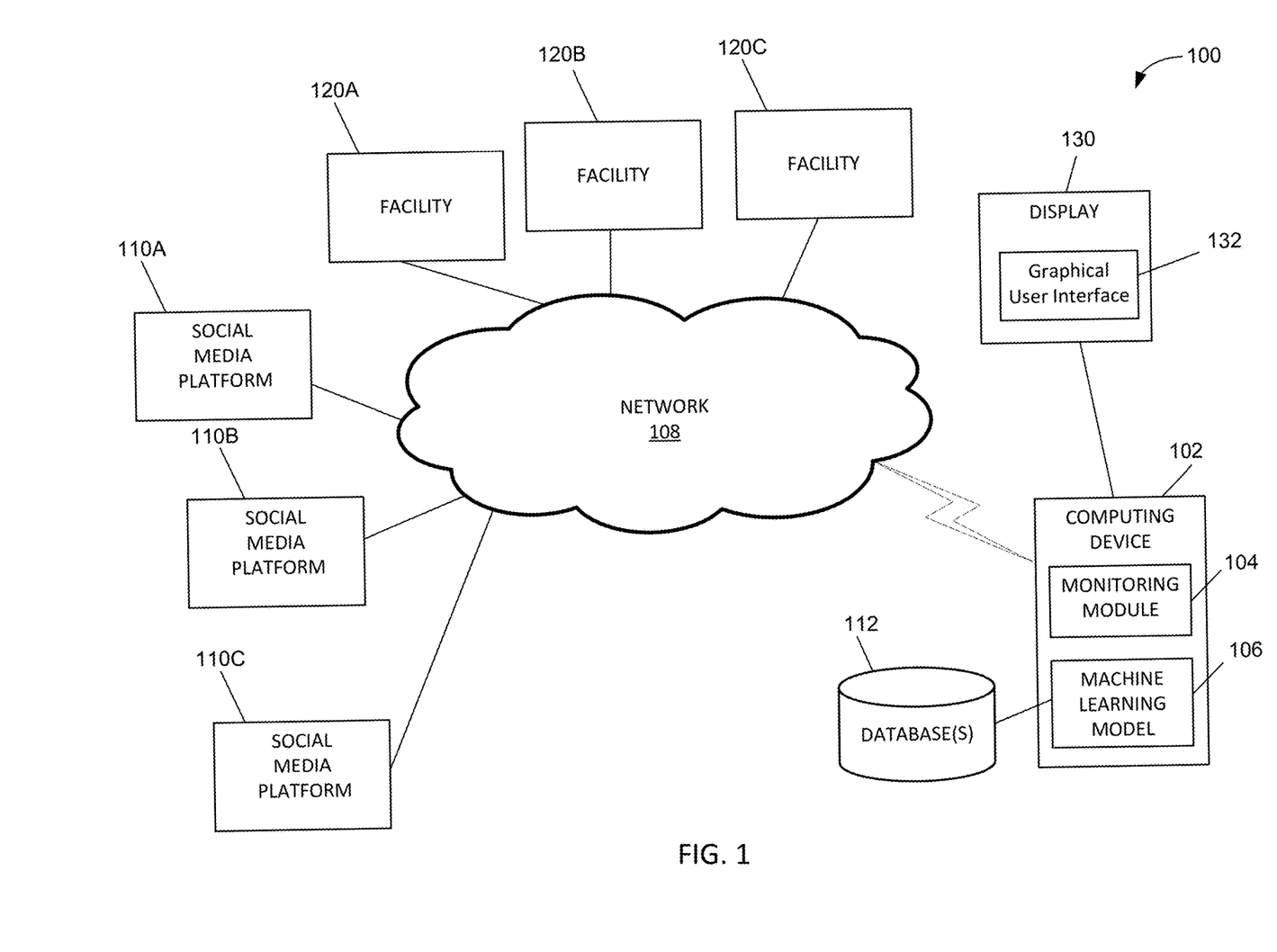
FIG. 1 is a block diagram of a system for identifying incidents, according to an example embodiment.

FIG. 1 is a block diagram depicting a monitoring system 100 for identifying violent incidents, according to an example embodiment. The monitoring system 100 can include a computing device 102, such as, but not limited to a server, executing a monitoring module 104. Monitoring module 104 may include or interact with machine learning model 106, and is configured to monitor social media data provided via one or more social medial platforms 110A, 110B, 110C (e.g. Twitter, Snapchat, Instagram, Facebook, etc.) accessible over a network 108 such as but not limited to the Internet. Monitoring system 100 may also include database 112 holding information related to one or more facilities 120A, 120B, 120C. In one embodiment, the operations of facilities 120A, 120B, and 120C are controlled by a single entity. In another embodiment, facilities 120A, 120B, 120C are controlled by more than a single entity. Monitoring system 100 may also include a display 130 and graphical user interface/real-time dashboard 132.

In an example embodiment, one or more portions of network 108 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The computing device 102, may connect to network 108 via a wired or wireless connection. In an example embodiment, the computing device 102 may execute monitoring module 104 to identify incidents associated with a facility controlled by an entity as described further herein. The computing device 110 can include one or more components of computing device 1000 of FIG. 10.

The database 112 may include one or more storage devices for storing data and/or instructions (or code) for use by the computing device 102. Computing device 102 may include one or more computers or processors. Computing device 102 can include one or more components of device 1000 of FIG. 10.

A major challenge in a retail store environment is responding promptly to sudden violent altercations occurring in or near stores or other facilities. Unreported incidents and delay in reporting can lead to increased risk along with bad publicity for an entity associated with the facility. By pairing social media feeds with different techniques, the handling of critical incidents can be improved by rapidly identifying and classifying incidents.

As noted above, embodiments of the present invention leverage publically available social media data to identify incident data relevant to an entity's facility or facilities. It should be appreciated that the social media data processed by the monitoring module is data that the social media user has chosen to make publically available. Embodiments examine social media posts to identify data associated with incidents related to a retail facility and other related entities. The monitoring module performs a number of filtering operations on social media data to determine incident type, location and severity. Although many of the examples herein focus on Twitter® data, it should be appreciated that other forms of social media data may also be analyzed by embodiments of the present invention.

In one embodiment, configurable variations in names of the entity or entities in charge of the facility may be used in a keyword search. In an embodiment, a Support Vector Machine (SVM) machine learning model is used in order to reduce noise associated when using keyword searches. For example, "StoreX looks to fight hunger" or "StoreX chicken is the bomb" can be classified as non-violent and thereafter ignored.

As discussed above, a machine learning model may be utilized in processing social media data. An exemplary sequence to create a model training set in an exemplary embodiment is shown below:

Begin:
1. Import packages
2. Verify credentials with Twitter®,
3. Create training dataset:
   a. Get tweets from generic handles and manually tag them as non-violent
   b. Get tweets from news handles that specifically tweet about violent incidents and manually tag them as violent
4. Import the dataset and clean it:
   a. Remove URLs and unwanted characters
   b. Split the sentence (tweet) into tokens (individual words)
5. Vectorize the dataset using Term Frequency-Inverse Document Frequency (tf-idf)
6. Split the data into train and test
7. The vectorized output of training dataset is passed to a Support Vector Machine (SVM) model
8. The accuracy of the model is tested by deploying it on the training dataset and checking for precision and accuracy
9. The parameters to the tf-idf and SVM model are fine-tuned and the accuracy is checked
10. Steps 5-9 are repeated until accuracy doesn't improve anymore
11. In order to further improve accuracy, false positives and false negatives (non-violent but classified as violent tweets and vice-versa) are manually re-classified and added back to the training dataset, and steps 4 through 10 are repeated
12. A new dataset with only violent incidents is manually classified into 10 different sub categories, and steps 4 through 11 are repeated to get the sub-category classification model
End A sample training set produced for a machine learning model in an embodiment is shown below:
'my sister calling me from ft away in StoreX'
'Officers who responded to StoreX on River Road at about pm found the girl with 30-year-old William Smith Jr'
'out of times I go to StoreX I lose my car in the parking lot'
3
'People Youre Only Bound to Meet at StoreX StoreX is a magnet to the woaf found'
3
'Reported Accident atnear STOREX JACKSON AVE WEST'
3
'Reynolds Wrap Foil Coupon ONLY Dollar General StoreX amp Target via post'
3
'shot outside Midlothian StoreX via YouTube'
3
'Small StoreX Grocery Haul via YouTube'
3
'Strangest People Found At StoreX'
3
'via BIRetailNews'
3
'via post'
2
'StoreX employees break window to save baby in hot car in South Carolina mews'
3
'StoreX Employees Reveal the Weirdest Thing Theyve Seen at Work via flipboard'
3
'StoreX guy steals something Clerk hey can you not steal from us LOL JUST ARREST ME OTHERWISE ILL KEEP STEALING'
3
'STOREX LONG BOARDS ARE AMAZING via YouTube'
3
'—StoreX on Black Friday lit—Rat eating pigeon in the streets of NYC—NYC landlords'
3
'StoreX or PayPal Cash'
3
'a yr old man just hit on me amp followed me through StoreX to my car this is the nd time I shouldnt be afraid to go places by myself'
3
'A day at the water the closest we get to it at least a StoreX parking lot with a nice view of a run off dit'
3
'A elderly lady at StoreX asked Melo how old he was and he says'
3
'A femalemallard hatching her eggs at the parking lot here at StoreX of LucasTX bird birds'
1
'A Florida man pulled out a machete and demanded another man steal beer from a nearby StoreX'
1
'A Florida man was arrested on charges he pulled a machete on someone to force them to steal beer from a StoreX'
3
'A German supermarket chain with ties to Trader Joes wants to win over the US with cheap ros via qz'
3
'A guy was trying on sunglasses at StoreX and was like aye mamas are these for women and I said idk but that they looked good on him'
3
'A In case of large or heavy items seeing same price online as instore w free shipping is plus Ex StoreX'
3
'A little girl at StoreX today said she hopes she gets as strong as me Tears'
1
'A male and female were both arrest after an unknown incident in the StoreX parking lot Caller stated to'
1
'A man accused of flashing a woman at StoreX turned himself in after seeing his photo on social media'

Figure 2:
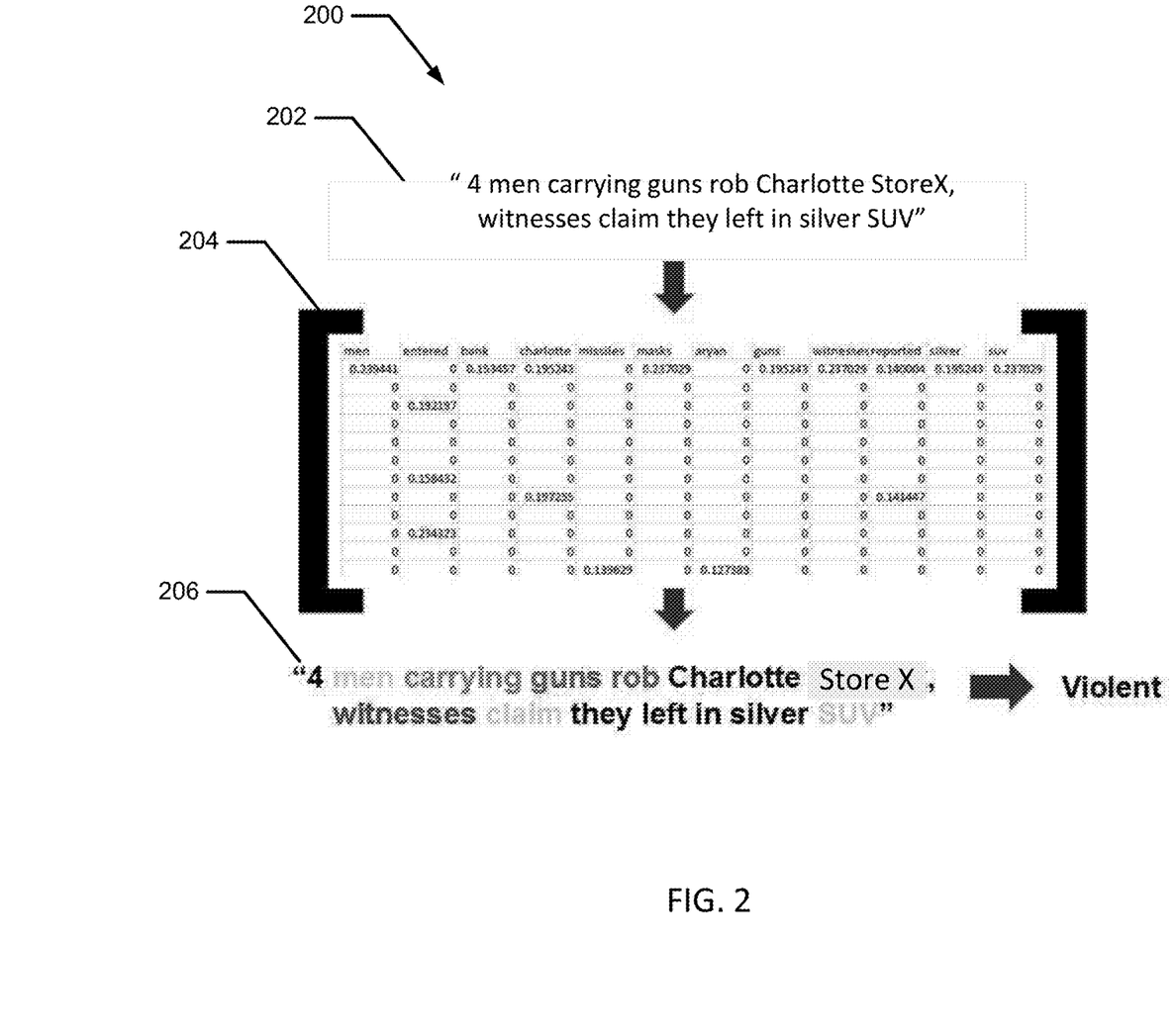
FIG. 2 is a diagram of a tweet and an associated Time Frequency-Inverse Document Frequency (TF-IDF) matrix according to an example embodiment.

Referring to FIG. 2, text from a tweet 202 may be stored in a Term Frequency-Inverse Document Frequency (TF-IDF) matrix 204 and provided a probability scored based on violent and non-violent content. Tweets which are not considered to be referencing a violent incident may be dropped by the system and not examined further to focus on tweets associated with some form of violence or serious injury.

Figure 3:
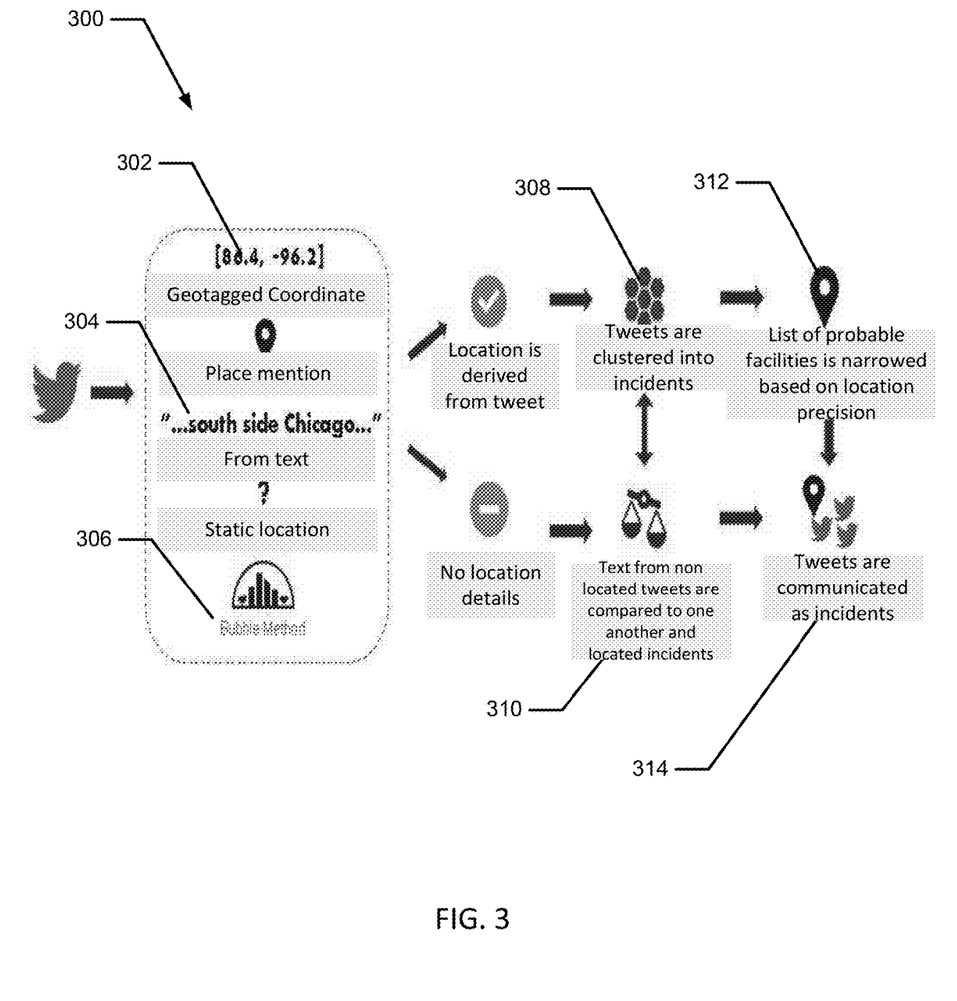
FIG. 3 is a diagram showing steps used to cluster tweets by location according to an example embodiment.

Referring now to FIG. 3, in one embodiment, violent tweets are clustered into "incidents" by assuming that it is very unlikely for more than a single violent incident associated with a facility to occur within the same city in a 48 hour period. By leveraging this assumption the present method and systems for identifying violent incidents can greatly reduce the number of tweets filling up an entity's emergency response center's notification feed when the response center is already aware of an ongoing or past incident. Location information can be derived from the tweet in a number of ways. In one embodiment, the tweet is first examined to determine if it contains geotagged coordinates 302 as these provide a definitive location. Failing that, the tweet may be examined by the system to see if it includes a place mentioned in the tweet 304 such as when a user can tag a place based on where they are going or where they were or otherwise mention a location. In an embodiment, the location may also be identified when it was sent from a known static location 306, such as tweets made using in-store Wi-Fi from known location coordinates. If no location details are voluntarily provided, the Tweet may then be searched for relative location details before the Tweet itself is passed along to an Emergency Operations Center (EOC) user, where the user can attempt to locate the tweet by viewing the user's other public social media data. Again, it should be noted that this public social media data examined by the system is data that the user has chosen to put into the public domain.

In some embodiments, additional locating techniques can also be used. For tweets with embedded news links, web scrapping may be performed to narrow down a city or address. Further, all tweets may go through a delayed location-based bubble search which can provide a likely city for an EOC to start their investigation. While the bubble search can be unreliable as it relies on the most recent user provided location (which is most commonly updated through use of public Wi-Fi or "mentions"), a broader picture may come into focus as clusters mature.

Figure 4:
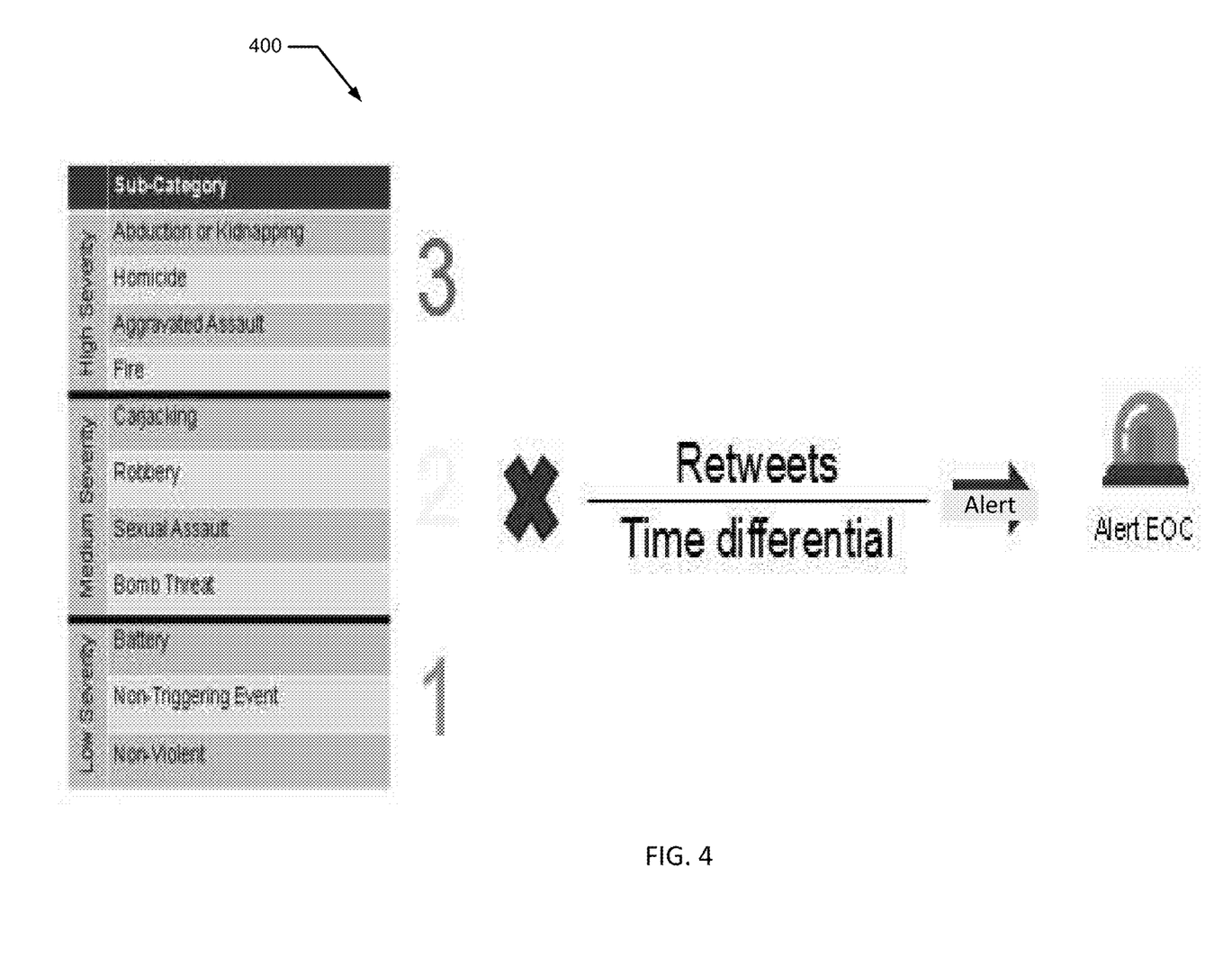
FIG. 4 is a diagram showing a formula for determining a severity score for a group of related tweets according to an example embodiment.

A summary of an exemplary process for classifying incidents and identifying location in an exemplary embodiment is shown below:

Import Packages
Set Directory
Define custom functions
Jaro: Calculates the "jaro" similarity between two strings
Toekizer porter: Finds the "stem" of each word in a string
Unique list: removes duplicates from list
Read SQL1: quick read function
Severity: Calculates the "base severity" based on subcategory and source ($1^{st}$ vs $3^{rd}$)
Location header: The text to be displayed based on "location ranker"
Retweet: "retweets" are handled differently than regular tweets.
No location: tweets with no derived location are still attempt to be added to existing cluster
  Compare current Tweet text to existing clusters
  Matched tweets are added to cluster->Cluster
  Unmatched tweets start new cluster
    Append new cluster to tbswat_tweet_info_search
Location search: Tweets with derived location are clustered according to their location
  Cluster: Cluster tweets into incidents
    Find Cluster_ID where tweet location==cluster location
    If tweet loc_type>cluster loc_type->update cluster loc_type and list of possible stores
    Add tweet to cluster text
    Update tbswat_tweet_info_search
  newCluster: Create new cluster->add location to locationlist (placelist, citylist, or statelist)
    Append new cluster to tbswat_tweet_info_search
    Add all possible stores
Upload violent & sub-category models
  The model
  Load tf-idf
Create SQL connection: cnxn
Read and manipulation of store details
  Read necessary files
  Merging store details with alignment files
  Create final table: merged
Initialize temporary tables and starting parameters
  Parameters: Cluster_ID and Read_limit
  Tables: placelist, citylist, statelist, SwatBot
Main:
  Identify violent tweets & subcategory prediction
  Violence prediction
  >If "violence"
    Subcategory_prediction
    Severity_score
    Update tbswat_tweet_streaming1
  Locate & Cluster violent tweets
    If "retweet"->Retweet function
    If geotagged→loc_type=10, assign store, locationSearch (place)
    If connected to wifi->loc_type=9, assign store, locationSearch(place)
    If "place mentioned"->loc_type=8, assign place, locationSearch(place)
    If "place mentioned"!=StoreX store location->loc_type=7, assign nearest store, locationSearch(place)
    Scrape Tweet text
      If city in tweet text
        If corresponding state in tweet text->loc_type=6, assign place, locationSearch(place)
        Elif->loc_type=4, assign city, locationSearch(city)
      If state in tweet text->loc_tpe=3, assign state, locationSearch(state)
    No location derived from tweet
      If URL present->Initiate web scraping->title and visible_text
        If city in title:
          If corresponding state in title->loc_type=5, assign place, locationSearch(place)
          Else->loc_type=2, assign city, locationSearch(city)
        Elif state in title->loc_type=1, assign state, locationSearch(state)
        Elif city in visible_text:
          If corresponding state in visible_text->loc_type=5, assign place, locationSearch(place)
          Else->loc_type=2, assign city, locationSearch(city)
        Elif state in visible_text->loc_type=1, assign state, locationSearch(state)
      Else->Compare text to active clusters->noLocation Referring to FIG. 4, in one embodiment, once a Tweet has been classified, located and clustered, a severity score is then provided (shown collectively as 400) to help an emergency response center for a controlling entity to prioritize ongoing incidents based on sub-category classification, number of related tweets & retweets, and time since initial report of incident. This severity score is then communicated to an EOC through indicators on a displayed map or in critical situations through direct communications such as emails and texts to relevant individuals or departments.

Figure 5:
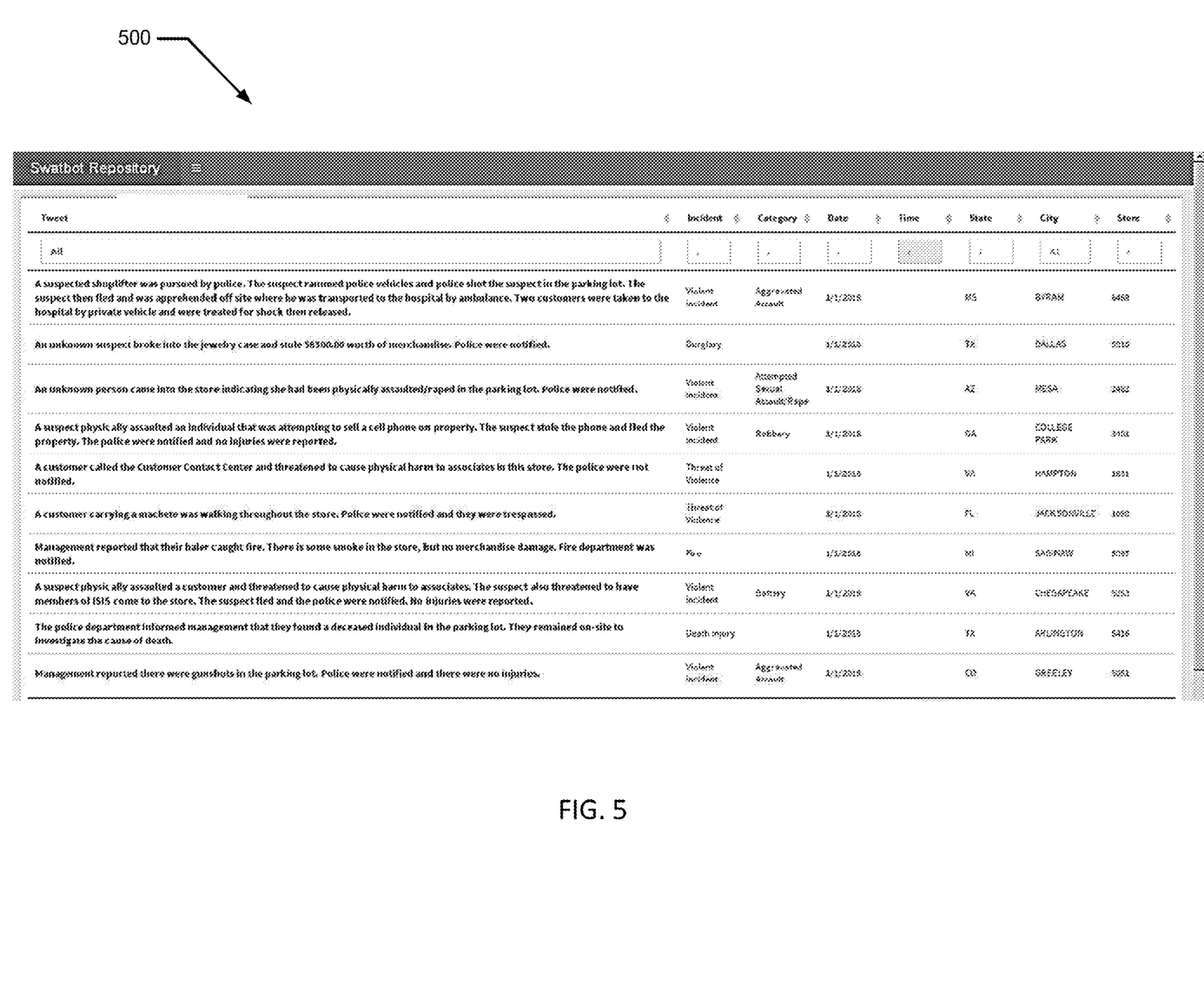
FIG. 5 is a diagram showing a repository of tweets that have already been reported according to an example embodiment.

As shown in FIG. 5, in another example of providing an alert to the response center for the entity and to reduce noise, up-to-date data 500 is leveraged to identify those Twitter incidents already reported, thus requiring no additional attention. The emergency operations response center for the entity may then be promptly notified of those tweets that don't have a corresponding reported incident so that they can take immediate action.

Figure 6:
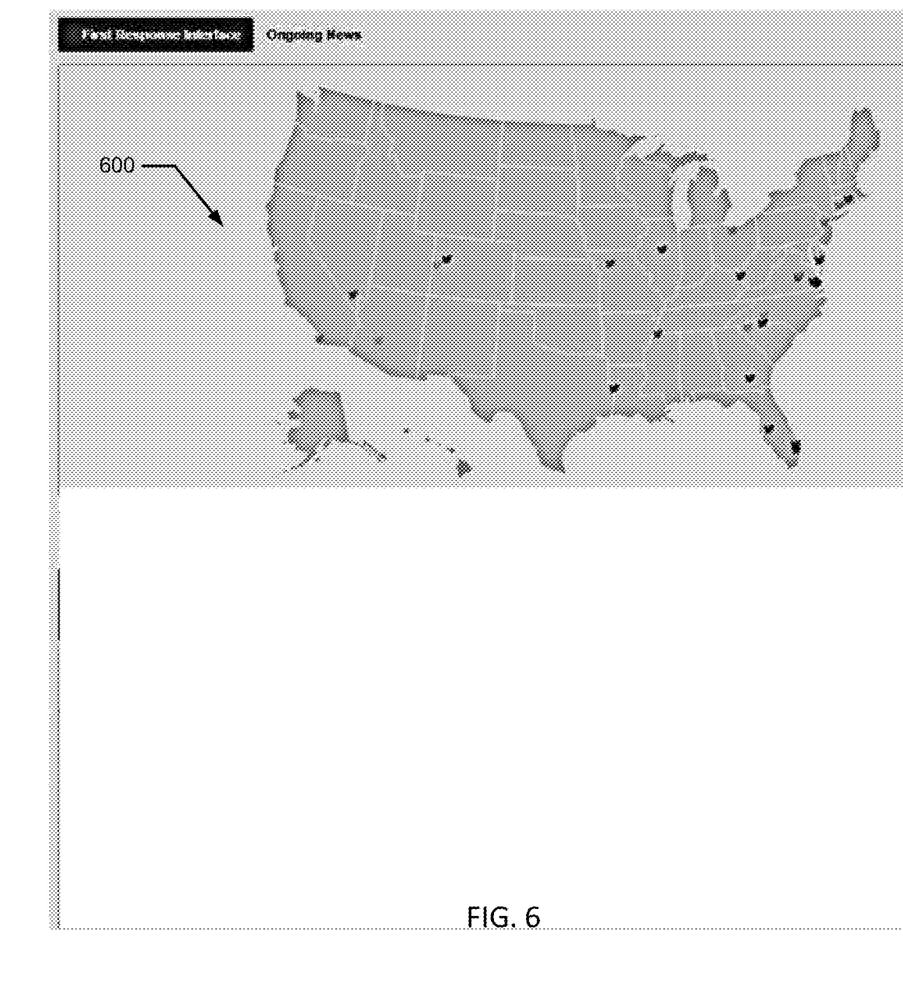
FIG. 6 is a screen shot showing incidents on a map according to an example embodiment.

Referring to FIG. 6, in one embodiment, a graphical user Interface 600 allows an EOC to quickly review ongoing incidents without having to sift through a large number of tweets. Tweets are clustered into incidents based on location and context. The exemplary view is reactive to real-time Twitter®, feeds and shows tweets as they appear on a map, where severity of the tweets is communicated to the user by color or other means.

The presently described system for identifying violent incidents need not be limited to violent incidents occurring at facilities associated with StoreX. For example, in another embodiment, a display may include three additional panels so that Users can see all of StoreX related tweets, breaking news from around the world and the ability to add custom search phrases. This allows an emergency response center to track incidents such as hurricanes, wildfires, and recalls at a glance which may affect the controlling entity's interests.

Figure 7:
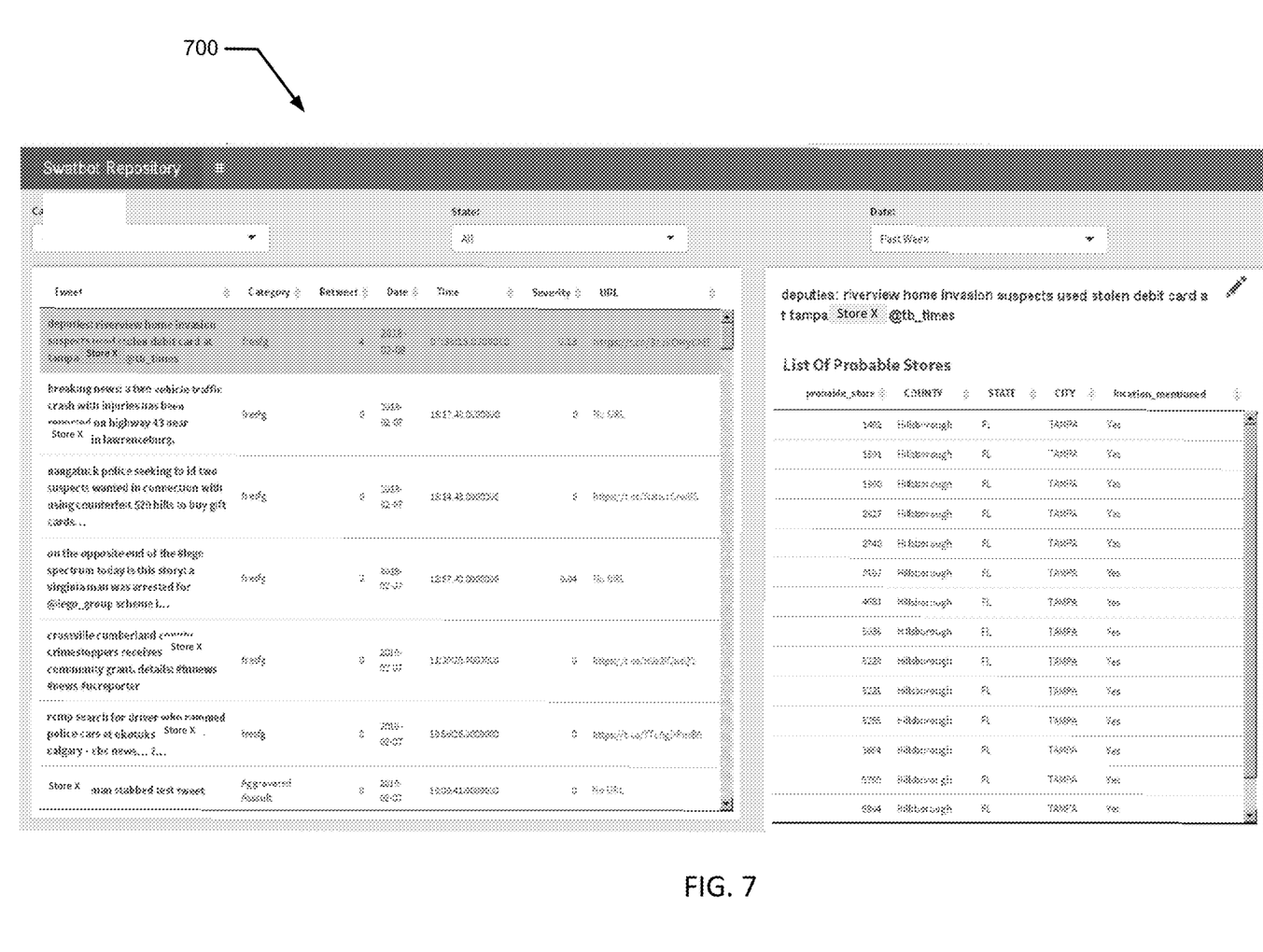
FIG. 7 is a screen shot showing a repository for reviewing historical data according to an example embodiment.

Referring now to FIG. 7, in an exemplary embodiment, a repository view 700 allows an EOC to review historical data and train the machine learning model to improve future prediction accuracy.

Figure 8:
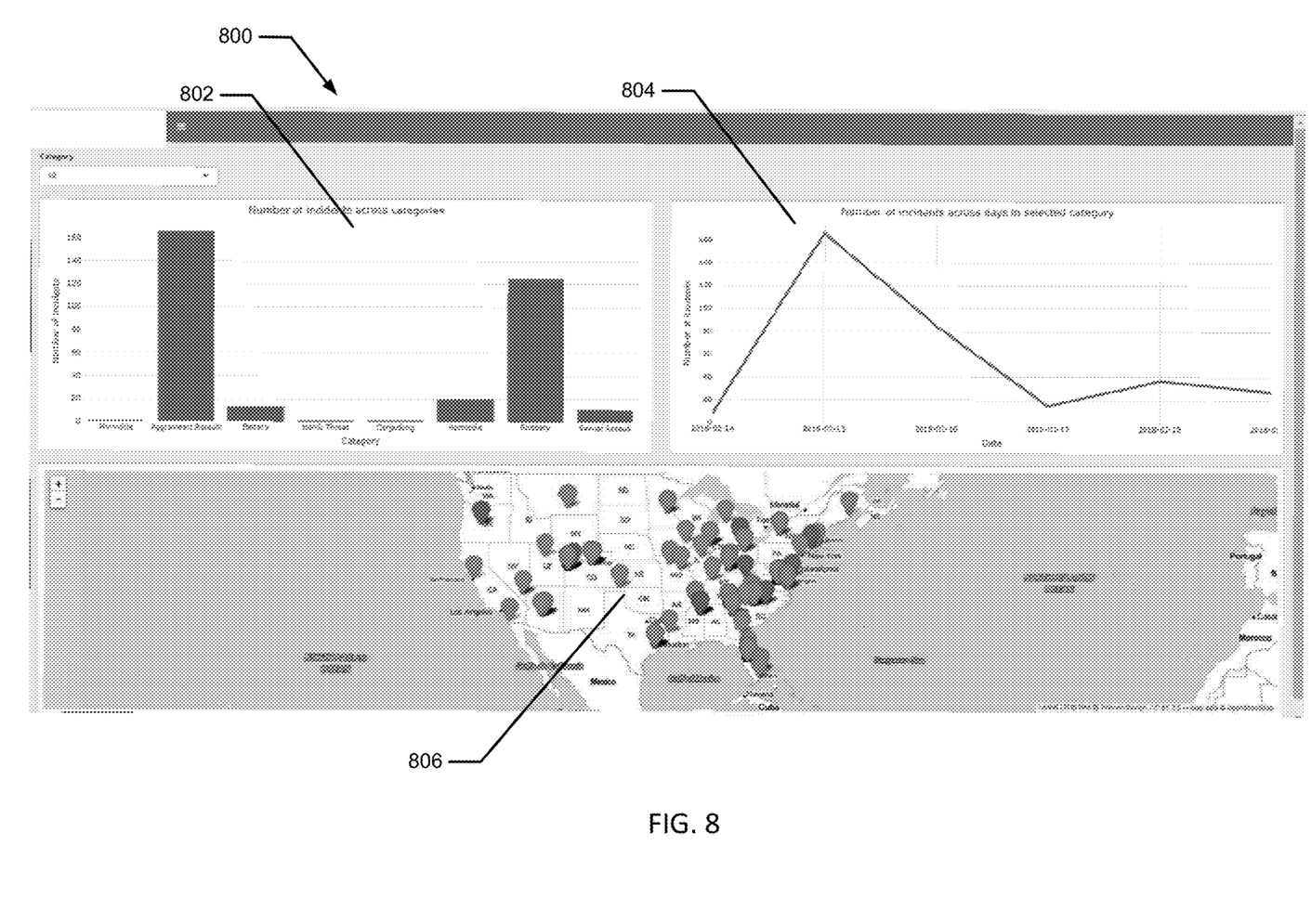
FIG. 8 is a screen shot of an executive view of output of the system according to an example embodiment.

FIG. 8 shows an executive view 800 in an exemplary embodiment which provides a high level understanding of StoreX & Twitter® to understand the public perspective and the impact of violence-related tweets. Graph 802 shows the number of incidents across different categories. Graph 804 shows a number of incidents across days in a selected category. Map 806 shows a location of different incidents across the U.S.

Figure 9:
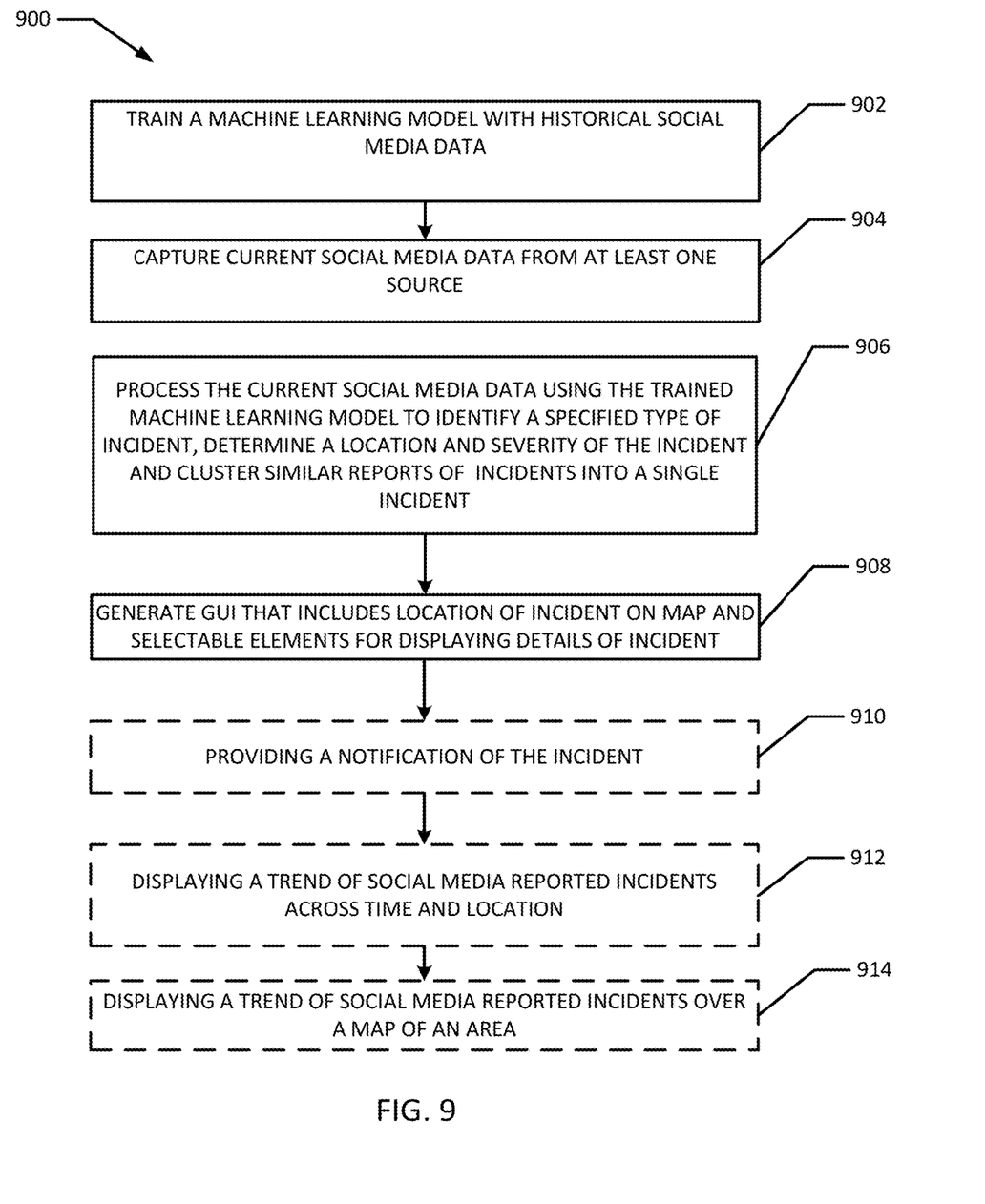
FIG. 9 is a flowchart illustrating an exemplary method for identifying incidents, according to an example embodiment.

FIG. 9 is a flow diagram showing illustrative processing that can be implemented within a system for identifying violent incidents in an exemplary embodiment. Rectangular elements are herein denoted "processing blocks" and represent computer software instructions or groups of instructions. Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

The sequence 900 begins with the monitoring system training a machine learning model with historical social media data associated with incidents of a specified type (step 902). For example, the model may be trained to recognize social media data indicative of violent incidents associated with one or more facilities controlled by a common entity such as a group of stores controlled by a corporate entity. Following the training of the of the machine learning model, the monitoring module captures current social media data from at least one source (step 904). For example, the social media data may be tweets, Facebook®, posts, Snapchat®, pictures and comments, Instagram®, pictures and comments or the like. The predetermined locations may be identified via a store name (e.g. StoreX), variations of the store name (e.g. Storx) or nicknames for the store (e.g., Storxmart).

The monitoring module processes the current social media data using the trained machine learning model to identify a specified type of incident, determine a location and severity of the incident, and to cluster multiple reports of an incident into a single incident (step 906). The types of incidents may include without limitation violent incidents, natural disaster incidents (affecting a facility) and user comments on purchases from facilities. It will be appreciated that other types of incidents not specifically listed herein may also be identified from the social media data. The location of the incidents may be determined as described above, The severity levels may assign an incident into separate subcategories so as to determine a needed response time. For example, violent incidents may include for example a robbery, an attempted kidnapping, a bomb threat, a physical altercation in the parking lot, etc. As a fight in the store parking lot between two customers over a parking space is less severe than a shooting or a kidnapping, different severity levels may be assigned to each incident and different notifications and responses may be provided.

Similar reports in social media data that are determined to refer to the same incident (e.g. refer to incidents of the same type, occurring at the same location, at the same time, etc.) are clustered together into a single incident by the monitoring module to limit notifications about the same incident. Receiving data from different sources aids in verification of the occurrence of the incident, but there is not a need to formulate a response to each separate report of the same incident. Accordingly, social media data that are identified as referring to the same incident are clustered together and treated as a single incident requiring a single notification.

The monitoring system includes a graphical user interface/real-time dashboard that displays a location of the incident on a map (step 908). For example, the map may display a location narrowed to a particular city and/or state where a store is located. Further, where information is available, the map may include a selectable element to enable a display of a particular location within a facility and/or additional details about the incident. The additional details may involve the particular circumstances involved with the incident. The circumstances may include for example the type of incident, the severity and context regarding the incident, a location of the incident, and a time the incident took place.

In one embodiment, the monitoring module may provide a notification of the incident (step 910). Different notifications may be required for different incidents. For example, if a robbery is taking place, a notification to customers, store employees and local authorities may be provided via electronic or other notification. If a bomb threat has been received, and an evacuation and closing of the store is required, a notification may be provided to local authorities, state authorities and/or federal authorities. If there is a fight in the parking lot, local authorities and store security may be notified. In one embodiment, depending upon the severity of the incident, the monitoring module may only send a notification after multiple determinations of the incident have been clustered so as to only report incidents in which confidence is high. In an embodiment, the monitoring module may only send a notification after the number of incidents clustered as a single incident exceeds a pre-determined threshold.

In an embodiment, the graphical user interface may display a trend of social media reported incidents across time and location (step 912). This can be used to determine what further actions may be taken. For example, if there are indications of a large number of incidents at a particular day and time (e.g., 6:00 on Sundays) then extra security may be needed for that time period.

In one embodiment, the graphical user interface may display a trend of social media reported incidents over a map of an area (step 914). This may allow, for example, incidents at one location to be compared to incidents at another location.

Figure 10:
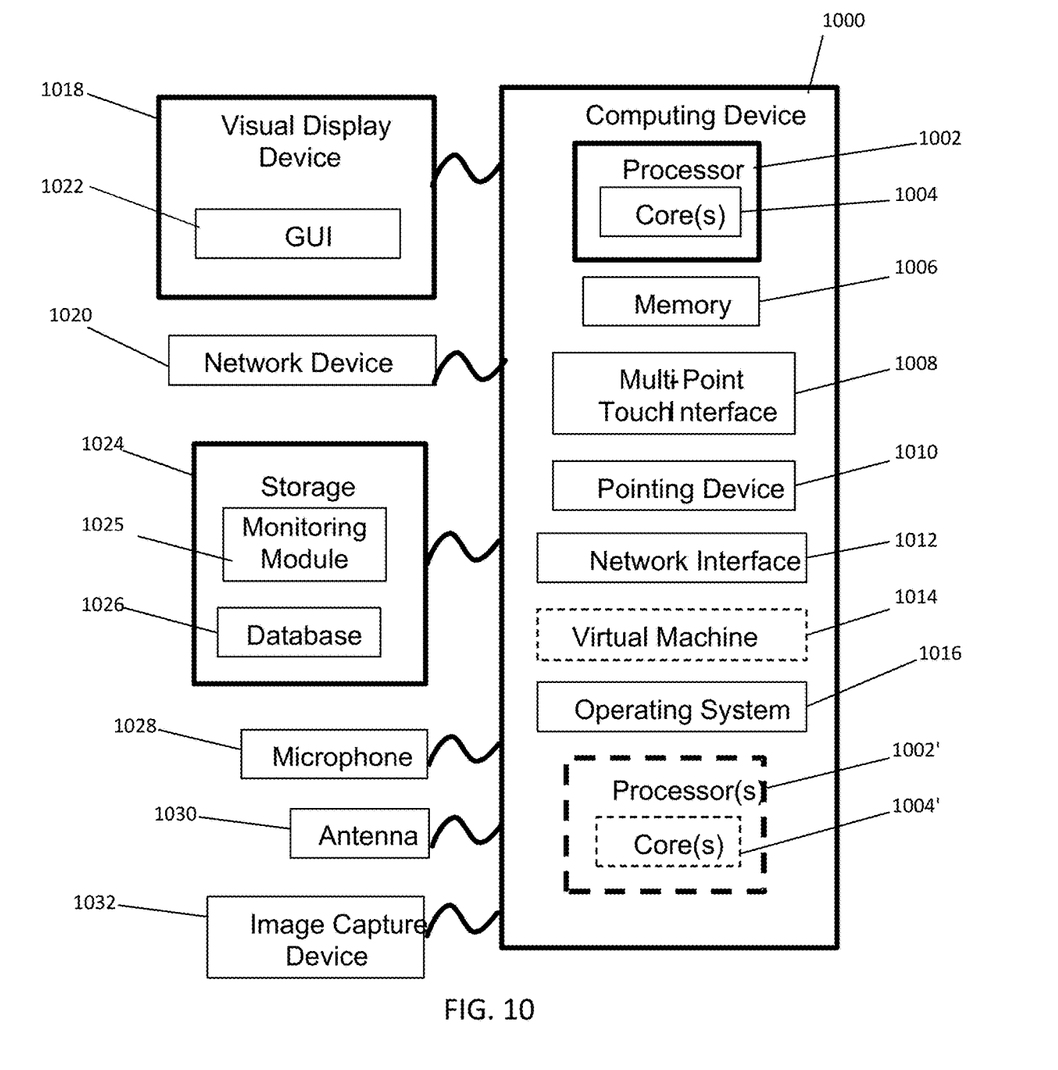
FIG. 10 is a block diagram of an exemplary computing device that may be used to implement exemplary embodiments described herein.

FIG. 10 is a block diagram of an exemplary computing device 1100 that can be used to perform one or more steps of the methods provided by exemplary embodiments. For example, computing device 1100 may be the computing device 102 and the server 102 as described in FIG. 1. The computing device 1100 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flashdrives), and the like. For example, memory 1106 included in the computing device 1100 can store computer-readable and computer-executable instructions or software for implementing exemplary embodiments. The computing device 1100 also includes processor 1102 and associated core 1104, and optionally, one or more additional processor(s) 1102' and associated core(s) 1104' (for example, in the case of computer systems having multiple processors/cores), for executing computer-readable and computer-executable instructions or software stored in the memory 1106 and other programs for controlling system hardware. Processor 1102 and processor(s) 1102' can each be a single core processor or multiple core (304 and 1104') processor.

Virtualization can be employed in the computing device 1100 so that infrastructure and resources in the computing device can be shared dynamically. A virtual machine 1114 can be provided to handle a process running on multiple processors so that the process appears to be using only one computing resource rather than multiple computing resources. Multiple virtual machines can also be used with one processor.

Memory 1106 can include a computer system memory or random access memory, such as DRAM, SRAM, EDO RAM, and the like. Memory 1106 can include other types of memory as well, or combinations thereof. An individual can interact with the computing device 1100 through a visual display device 1118, such as a touch screen display or computer monitor, which can display one or more user interfaces 1122 for receiving data from the individual (e.g., order data and travel data). The visual display device 1118 can also display other aspects, elements and/or information or data associated with exemplary embodiments. The computing device 1100 can include other I/O devices for receiving input from a individual, for example, a keyboard or another suitable multi-point touch interface 1108, a pointing device 1110 (e.g., a pen, stylus, mouse, or trackpad). The keyboard 1108 and the pointing device 1110 can be coupled to the visual display device 1118. The computing device 1100 can include other suitable conventional I/O peripherals.

The computing device 1100 can also include one or more storage devices 1124, such as a hard-drive, CD-ROM, or other computer readable media, for storing data and computer-readable instructions and/or software, such as monitoring module 104 and machine learning model 106 of the monitoring system 100 shown in FIG. 1 that implements exemplary embodiments of the notification system as described herein, or portions thereof, which can be executed by processor 1002 to generate user interface 1122 on display 1118. Exemplary storage device 1124 can also store one or more databases for storing suitable information required to implement exemplary embodiments. The databases can be updated by an individual or automatically at a suitable time to add, delete or update one or more items in the databases. Exemplary storage device 1124 can store monitoring module 125 and one or more databases 1126 for storing provisioned data, and other data/information used to implement exemplary embodiments of the systems and methods described herein.

The computing device 1100 can include a network interface 1112 configured to interface via one or more network devices with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1112 can include a built-in network adapter, network interface card, PCMCIA network card, card bus network adapter, wireless network adapter, USB network adapter, modem or another device suitable for interfacing the computing device 700 to a type of network capable of communication and performing the operations described herein. Moreover, the computing device 1100 can be a computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 1100 can run an operating system 1116, such as versions of the Microsoft® Windows® operating systems, the different releases of the Unix and Linux operating systems, a version of the MacOS® for Macintosh computers, an embedded operating system, a real-time operating system, an open source operating system, a proprietary operating system, an operating systems for mobile computing devices, or another operating system capable of running on the computing device and performing the operations described herein. In exemplary embodiments, the operating system 1116 can be run in native mode or emulated mode. In an exemplary embodiment, the operating system 1116 can be run on one or more cloud machine instances.

The description is presented to enable a person skilled in the art to create and use a computer system configuration and related method and systems for identifying violent incidents. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component or step. Likewise, a single element, component or step can be replaced with a plurality of elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts have been provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A monitoring system for identifying incidents, the system comprising:
   a computing device equipped with a processor and configured to execute a monitoring module that when executed:
      captures current social media data from at least one source relating to an incident occurring at one or more of a group of locations associated with one or more facilities controlled by an entity;
      processes the current social media data using a trained machine learning model, wherein the trained machine learning model is trained with historical social media data associated with past incidents, the processing:
      identifies a specified type of incident associated with the social media data,
      determines a severity rating for the incident;
      determines a location of the incident associated with one or more of the one or more group of locations, and
      clusters the incident with one or more previous identified incidents as a single incident;
      causes a notification of the single incident to be sent to an emergency response center;
      clusters a subsequent incident with the single incident when the subsequent incident occurs at the location, has the specified type of incident and occurs within a predetermined period of time of the single incident, such that an additional notification is not sent to the emergency response center; and
   a graphical user interface that:
      displays a location of the single incident on a map; and
      includes selectable elements for displaying details of the single incident.

2. The system of claim 1 wherein the determined location is in one of the one or more facilities.

3. The system of claim 1 wherein the determined location is outside one of the one or more facilities.

4. The system of claim 1 wherein the specified type of incident is a violent incident.

5. The system of claim 1 wherein the monitoring module automatically transmits a notification of the incident via the computing device.

6. The system of claim 1 wherein the graphical user interface displays a trend of a plurality of determined incidents across time and location.

7. The system of claim 6 wherein the graphical user interface displays the trend using the map.

8. A computing-device implemented method for identifying violent incidents from social media data, the computing device equipped with a processor, the method comprising:
   capturing current social media data from at least one source relating to an incident occurring at one or more of a group of locations associated with one or more facilities controlled by an entity; and
   processing the current social media data using a trained machine learning model, wherein the trained machine learning model is trained with historical social media data associated with past incidents, the processing:
   identifying a specified type of incident associated with the social media data,
   determining a severity rating for the incident;
   determining a location of the incident associated with one or more of the one or more group of locations;
   clustering the incident with one or more previous identified incidents as a single incident;
   causing a notification of the single incident to be sent to an emergency response center;
   clustering a subsequent incident with the single incident when the subsequent incident occurs at the location, has the specified type of incident and occurs within a predetermined period of time of the single incident, such that an additional notification is not sent to the emergency response center; and
   generating a graphical user interface that displays a location of the single incident on a map, the graphical user interface including selectable elements enabling a user to display details of the single incident.

9. The method of claim 8 wherein the determined location is in one of the one or more facilities.

10. The method of claim 8 wherein the determined location is outside one of the one or more facilities.

11. The method of claim 8 wherein the specified type of incident is a violent incident.

12. The method of claim 8, further comprising:
transmitting automatically a notification of the incident.

13. The method of claim 8, further comprising:
displaying, via the graphical user interface, a trend of a plurality of determined incidents across time and location.

14. The method of claim 13 wherein the trend is displayed using the map.

15. A non-transitory machine-readable medium storing instructions executable by a computing device equipped with a processor, wherein execution of the instructions causes the computing device to:
capture current social media data from at least one source relating to an incident occurring at one or more of a group of locations associated with one or more facilities controlled by an entity; and
process the current social media data using a trained machine learning model, wherein the trained machine learning model is trained with historical social media data associated with past incidents, the processing:
identifies a specified type of incident associated with the social media data,
determines a severity rating for the incident;
determines a location of the incident associated with one or more of the one or more group of locations;
clusters the incident with one or more previous identified incidents as a single incident;
causes a notification of the single incident to be sent to an emergency response center;
clusters a subsequent incident with the single incident when the subsequent incident occurs at the location, has the specified type of incident and occurs within a predetermined period of time of the single incident, such that an additional notification is not sent to the emergency response center; and
generates a graphical user interface that displays a location of the single incident on a map, the graphical user interface including selectable elements enabling a user to display details of the single incident.

16. The medium of claim 15 wherein the determined location is in one of the one or more facilities.

17. The medium of claim 15 wherein the determined location is outside one of the one or more facilities.

18. The medium of claim 15 wherein the specified type of incident is a violent incident.

19. The medium of claim 15, wherein the instructions when executed cause the computing device to:
transmit automatically a notification of the incident.

20. The medium of claim 15, wherein the instructions when executed cause the computing device to:
display, via the graphical user interface, a trend of a plurality of determined incidents across time and location.

21. The medium of claim 20 wherein the trend is displayed using the map.

* * * * *